United States Patent [19]

Nylund

[11] Patent Number: 5,778,035
[45] Date of Patent: Jul. 7, 1998

[54] CONTROL OF COOLANT FLOW IN A NUCLEAR REACTOR

[75] Inventor: Olov Nylund, Västerås, Sweden

[73] Assignee: ABB Atom AB, Västerås, Sweden

[21] Appl. No.: 750,587

[22] PCT Filed: Jun. 2, 1995

[86] PCT No.: PCT/SE95/00635

§ 371 Date: Dec. 6, 1996

§ 102(e) Date: Dec. 6, 1996

[87] PCT Pub. No.: WO95/34898

PCT Pub. Date: Dec. 21, 1995

[30] Foreign Application Priority Data

Jun. 13, 1994 [SE] Sweden .................. 9402074

[51] Int. Cl.$^6$ .............. G21C 15/00; G21C 3/34
[52] U.S. Cl. .............. 376/361; 376/439; 376/462
[58] Field of Search .............. 376/439, 443, 376/462, 361

[56] References Cited

U.S. PATENT DOCUMENTS

| | | | |
|---|---|---|---|
| 3,281,327 | 10/1966 | Webb et al. | 371/439 |
| 3,395,077 | 7/1968 | Tong et al. | 376/439 |
| 3,749,640 | 7/1973 | Israel | 376/439 |
| 3,862,000 | 1/1975 | Pugh et al. | 376/439 |
| 4,190,494 | 2/1980 | Olsson | 376/462 |
| 4,666,664 | 5/1987 | Doshi | 376/443 X |
| 4,692,302 | 9/1987 | DeMario et al. | 376/439 |
| 4,795,608 | 1/1989 | Nylund | 376/444 |
| 5,249,210 | 9/1993 | Nylund et al. | 376/352 |
| 5,339,341 | 8/1994 | King et al. | 376/439 |

*Primary Examiner*—Charles T. Jordan
*Assistant Examiner*—Matthew J. Lattig
*Attorney, Agent, or Firm*—Pollock, Vande Sande & Priddy

[57] ABSTRACT

A nuclear fuel core in a pressurized-water reactor including fuel assemblies, each of which comprise a top tie plate; a bottom tie plate, the top tie plate and the bottom tie plate having through-openings for passing coolant flowing from beneath upwards through each of the fuel assemblies; elongated elements, arranged between the top tie plate and the bottom tie plate; a mixing cross section having a mixing center, the mixing cross section extending through four orthogonally arranged fuel assemblies and having a size corresponding to at least that of two fuel assemblies; and a plurality of spacers for retaining and mutually fixing the elongated elements, the plurality of spacers having flow control members for controlling coolant flow around the mixing center. A nuclear fuel core in a boiling water reactor is also disclosed.

9 Claims, 13 Drawing Sheets

Fig. 1

PRIOR ART

Fig. 2

PRIOR ART

CONTROL OF COOLANT FLOW IN A NUCLEAR REACTOR

TECHNICAL FIELD

The present invention relates to a method for equalizing the cooling between less loaded and more loaded sub-regions of a fuel assembly or between fuel assemblies in a light-water nuclear reactor. The equalization of the cooling is achieved by mixing a coolant flow within a mixing cross section comprising four orthogonally arranged sub-regions which may have considerably different power levels because of different degrees of burnup or the effect from the surroundings. The mixing is made possible by creating a special flow pattern in a horizontal cross section in the mixing cross section. The flow pattern, in turn, is achieved with the aid of spacers, that is, those support means which fix the fuel rods in spaced relationship to each other and are arranged at a plurality of levels along the fuel rods.

BACKGROUND OF THE INVENTION

A fuel assembly in a boiling water nuclear reactor (BWR) consists of an elongated tubular container, often with a rectangular or square cross section, which is open at both ends forming a continuous flow passage, through which the coolant of the reactor is able to flow. The fuel assembly comprises a large number of equally elongated tubular fuel rods, arranged in parallel in a certain definite, normally symmetrical pattern. At the top, the fuel rods are retained by a top tie plate and at the bottom by a bottom tie plate. To allow coolant in the desired manner to flow past the fuel rods, it is important to keep them at a distance from each other and prevent them from bending or vibrating when the reactor is in operation. For this purpose, a plurality of spacers are used, distributed along the fuel assembly in the longitudinal direction. Some fuel assemblies for boiling water reactors are divided into so-called sub-assemblies. Such a sub-assembly is disclosed in U.S. Pat. No. 4,795,608. Between the sub-assemblies there are openings allowing coolant to pass between the sub-assemblies.

A fuel assembly for a pressurized-water nuclear reactor (PWR) has, in principle, the same design as a fuel assembly for a boiling water nuclear reactor (BWR), apart from the fact that the fuel rods are not enclosed by any tubular container and the fact that their number is higher.

At the bottom each fuel assembly is provided with an essentially equally large amount of coolant, but higher up in the core it is desirable to transfer water from less loaded regions to more loaded regions in a fuel assembly or between fuel assemblies.

The lower the power output from a fuel assembly, or part of a fuel assembly, the less cooling it needs. Conversely, a higher power may be taken out from a fuel assembly, or part of a fuel assembly, the better its cooling is. The more the fuel is consumed in a fuel assembly, the lower is the power that can thereafter be extracted from the fuel assembly.

One way of achieving transfer of coolant from less loaded to more loaded fuel assemblies is disclosed in Swedish patent application No. 9003330-9. By irradiation-dependent growth of tabs arranged at spacers in the fuel assembly, the reduction is increased successively during the life cycle of the fuel assembly. In this way, coolant is transferred from older, less loaded assemblies to newer, more loaded assemblies. It is also known to create mixing of coolant locally between adjacently located fuel rods. This is done by means of mixing vanes in the form of tabs arranged at the downstream edge of the spacer, thus diverting the flow such that mixing occurs. Such mixing tabs are described, inter alia, in U.S. Pat. No. 3,395,077.

U.S. Pat. No. 3,749,640 shows four orthogonally arranged fuel assemblies for a pressurized-water reactor which are provided with spacers with mixing vanes. The mixing vanes are adapted to guide the flow concentrically around the intersectional points between adjacently located fuel elements. The flow control results in cold coolant being moved into and hot coolant being moved out of a concentric region with high power, and in cold coolant being moved into and hot coolant being moved out of that fuel assembly which has the highest power. By controlling the flow concentrically around the intersectional points between adjacently located fuel assemblies, the coolant is mixed in a cross section in the core which corresponds to the size of a pressurized-water reactor fuel assembly.

U.S. Pat. No. 4,190,494 shows control of coolant in a mixing cross section, wherein the size of the mixing cross section corresponds to the size of a fuel assembly. This U.S. patent also shows flow-indicating spacer springs which guide the coolant such that the fuel rods are moved by the coolant towards resilient supports arranged in the spacers.

The object of the present invention is to provide a further improved equalization of the enthalpy in a cross section of a nuclear fuel core for a pressurized-water reactor. This is achieved by mixing within a larger mixing cross section than what is previously known, with the aid of the characteristic features described in the characterizing part of claim 1.

It is a further object of the invention to provide equalization of the enthalpy in a cross section of a nuclear fuel core for a boiling water reactor. This is achieved by mixing within a mixing cross section with the aid of the characteristic features which are described in the characterizing part of claim 2.

It is a still further object of the invention to provide equalization of the enthalpy in a nuclear fuel core in such a way that the risk of abrasion of the longitudinal elements fixed by the spacers is minimized. This is achieved by controlling the coolant in the mixing cross section with the aid of the characteristic features which are described in the characterizing part of claim 3.

SUMMARY OF THE INVENTION

The invention relates to a nuclear fuel core with members for achieving equalization of the cooling between less loaded subregions and more loaded sub-regions in a fuel assembly or between fuel assemblies in a light-water nuclear reactor. The equalization is accomplished by mixing of coolant flow within a mixing cross section comprising four orthogonally arranged sub-regions. A sub-region comprises either a fuel assembly for a pressurized-water reactor, a sub-assembly for a boiling water reactor, or at least 12 fuel rods in a fuel assembly for a light-water reactor. The mixing results in the temperature or the steam content of the coolant being equalized, that is, the enthalpy in the mixing cross section is equalized, thus reducing the maximum temperature or the maximum steam content of the coolant. The mixing is accomplished with the aid of the spacers which may be designed in a plurality of different ways according to the embodiments described below.

Depending on which type of nuclear reactor the fuel assemblies are to be used in, somewhat different demands are placed. From a mechanical point of view, some nuclear reactors permit reinsertion of fuel assemblies rotated in multiples of 90° relative to the original insertion position whereas other reactors permit rotation and reinsertion of the fuel assemblies in multiples of 180° relative to the original insertion position. For administrative reasons, however, it is in many cases desirable to replace the fuel assemblies without any preceding rotation.

A first way of achieving mixing and equalization of the enthalpy between sub-regions in a mixing cross section is to transfer coolant from one sub-region to an adjacent sub-region by diverting the flow, within an individual sub-region, in such a way that the direction of the coolant flow into the sub-region substantially differs 90° from the direction of the coolant flow out of the sub-region. Control members are arranged for the flow control through the sub-regions. The control members in one sub-region are arranged rotated through 90° in relation to the control members arranged in a corresponding position in an adjacent sub-region, the direction of the coolant flow within the mixing cross section thus being one and the same, for example clockwise. In the axial extension of the mixing cross section there is thus formed a coolant flow formed like a helical screw.

Another way of accomplishing mixing and enthalpy equalization between sub-regions is to control the coolant flow across the individual sub-region. This mixing is hereinafter referred to as a cross-flow. With respect to the flow control, the four orthogonally arranged sub-regions are rotated through 90° in relation to each other such that the direction of the coolant flow in the mixing cross section is directed in one and the same direction, for example clockwise.

A third way of accomplishing mixing and enthalpy equalization between sub-regions is to control the coolant in a substantially diagonal direction through the individual sub-regions. This mixing is hereinafter referred to as diagonal flow. In this case, the mixing cross section comprises a cross-section area which in a horizontal plane in one sub-region is arranged on one side of a diagonal section and three corresponding and adjacently located cross-section areas. Thus, the mixing cross section comprises four diagonal sections of sub-regions which, with respect to the flow control, are rotated through 90° in relation to each other and such that the direction of the coolant flow in the mixing cross section becomes one and the same. The velocity of the coolant flow in the mixing cross section, upon comparison with the same sub-region size, may be lower in this embodiment than in the ones described above since the mixing occurs within a smaller cross section.

Any problems with vibrations and abrasion caused by cross-flows may be avoided by providing each individual spacer cell in the spacer with at least one fixed support oriented such that the fuel rod extending through the cell is pressed against the fixed support or supports by the coolant flow.

Pressurized-water reactors which permit reinsertion of fuel assemblies rotated in multiples of 90° relative to the original insertion position require only one type of fuel assemblies. Pressurized-water reactors which only permit reinsertion of fuel assemblies rotated in multiples of 180° require two types of fuel assemblies which differ with respect to the orientation of the flow control members.

By mixing the flow within a larger mixing cross section, compared with the prior art, of a nuclear fuel core for a pressurized-water reactor which corresponds to at least two pressurized-water reactor fuel assemblies, an improved equalization of the enthalpy in the cross section of the core is obtained compared with U.S. Pat. No. 3,749,640. The reason is that by mixing in a larger cross section, greater enthalpy differences may be reached, resulting in greater equalization. This technical effect, that is, the mixing within a larger region, is very great and very important.

By achieving a mixing of coolant in a mixing cross section in a nuclear fuel core for a boiling water reactor, a considerably improved enthalpy equalization is obtained compared with the prior art in which only a certain degree of enthalpy equalization is obtained when the water in the BWR assembly boils.

By arranging flow control members in the spacer such that the fuel rods make contact with fixed supports therein because of the flow of the coolant in the mixing cross section, problems with abrasion are avoided. In addition, the flow control members have a considerably greater power than the flow-indicating spacer springs described in U.S. Pat. No. 4,190,494.

The advantage of the invention is that fuel assemblies may be loaded higher without the risk of so-called DNB (Departure from Nucleate Boiling) or the risk of dryout on the surface of the fuel rods, which may lead to fuel damage. The maximum power output from a fuel assembly may in favorable cases be increased by the order of magnitude of 15%.

An additional advantage of the invention is that problems with corrosion are avoided. Fuel rods for pressurized-water reactors are very sensitive to corrosion at high temperatures. By the mixing, the maximum temperature is decreased, thus considerably reducing the risk of corrosion.

The advantage of the invention is that in those cases where the mixing cross-section comprises four orthogonally arranged fuel assemblies for a pressurized-water reactor, a good mixing over the cross section of the fuel assemblies and the gaps which are formed between the fuel assemblies is achieved.

BRIEF DESCRIPTION OF THE DRAWINGS

The invention will be explained in greater detail by description of embodiments with reference to the accompanying drawings.

DESCRIPTION OF THE PREFERRED EMBODIMENTS

Figure 1:
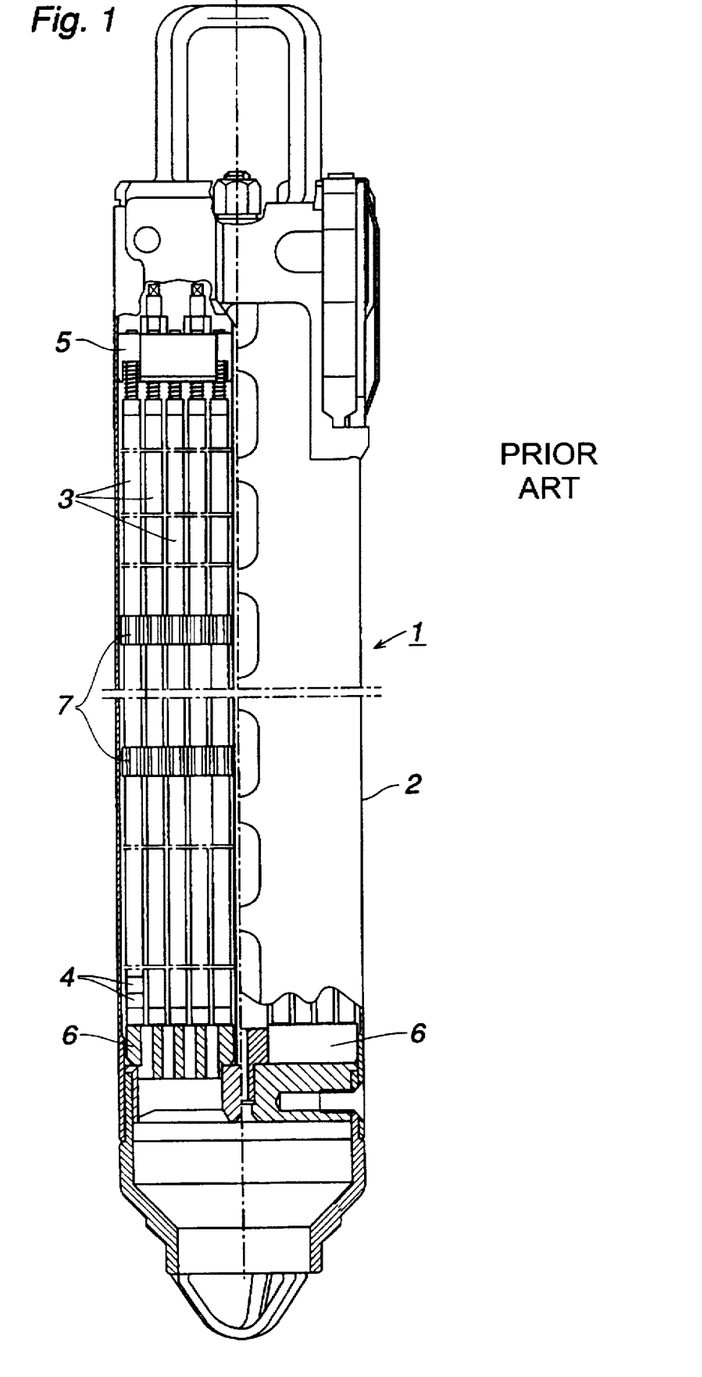
FIG. 1 schematically shows, in a side view, a fuel assembly for a boiling water nuclear reactor.

FIG. 1 shows a boiling water reactor (BWR) fuel assembly 1 which comprises an elongated tubular container, of rectangular cross section, referred to as fuel channel 2. The fuel channel 2 is open at both ends so as to form a continuous flow passage through which the coolant of the reactor flows from the bottom to the top. The fuel assembly 1 comprises a large number of equally elongated tubular fuel rods 3, arranged in parallel in a bundle, in which pellets 4 of a nuclear fuel are arranged. The fuel rods 3 are retained at the top by a top tie plate 5 and at the bottom by a bottom tie plate 6. The fuel rods 3 are kept spaced from each other by means of spacers 7 and are prevented from bending or vibrating when the reactor is in operation.

Figure 2:
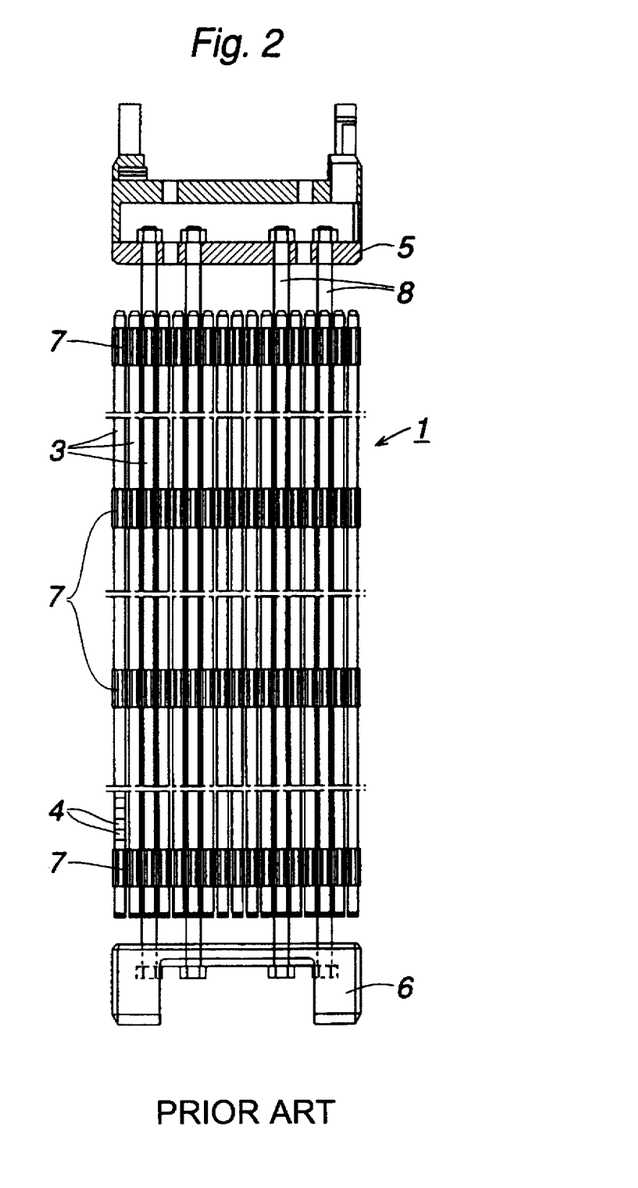
FIG. 2 schematically shows, in a side view, a fuel assembly for a pressurized-water nuclear reactor.

FIG. 2 shows a pressurized-water reactor (PWR) fuel assembly 1 which comprises a number of elongated tubular fuel rods 3 and control rod guide tubes 8 arranged in parallel. The fuel rods 3 contain pellets 4 of a nuclear fuel. The control rod guide tubes 8 are retained at the top by a top nozzle 5 and at the bottom by a bottom nozzle 6. The fuel rods 3 are kept spaced from each other by means of spacers 7.

Figure 3:
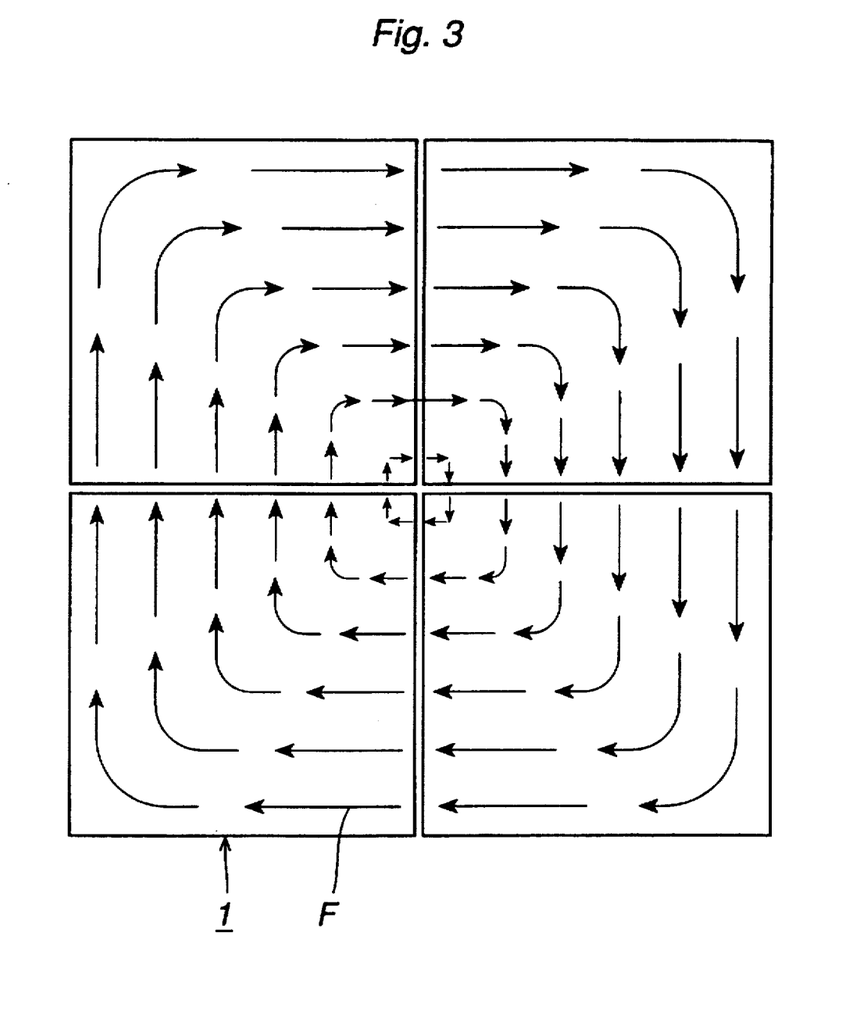
FIG. 3 schematically shows mixing of a coolant flow within a group of four fuel assemblies by diverting the coolant flow through 90° within a fuel assembly for a pressurized-water reactor.

FIG. 3 shows a mixing cross section comprising four orthogonally arranged sub-regions wherein each sub-region comprises a fuel assembly 1. Flow arrows F in FIG. 3 show how the coolant flow flows in the mixing cross section. Mixing of the coolant flow and temperature equalization thereof within the mixing cross section are achieved by diverting the coolant flow within a sub-region 1 such that the direction of the coolant flow into the sub-region 1 differs substantially 90° from its direction of flow out of this sub-region 1. The subregions 1 are designed with equal spacers 7, but the spacers 7 are arranged rotated through 90° in relation to each other and positioned such that the direction of flow F becomes one and the same within the mixing cross section.

Figure 4:
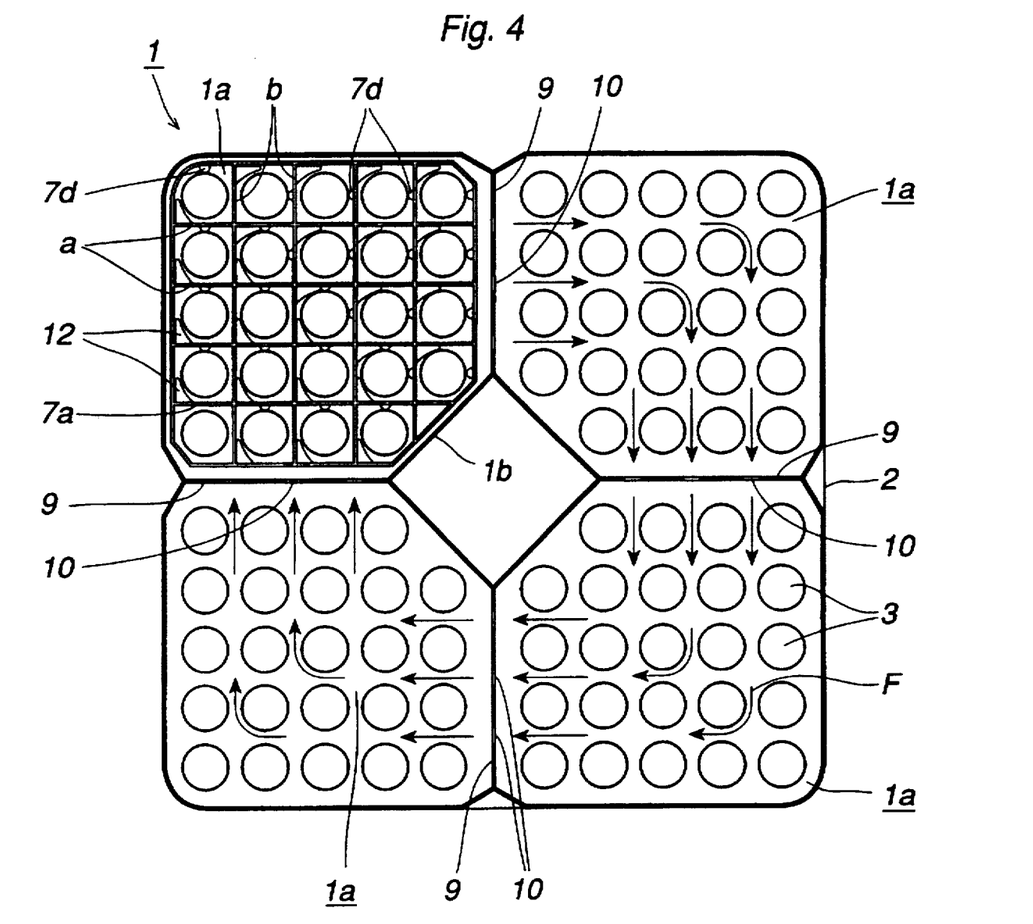
FIG. 4 schematically shows mixing of a coolant flow within a group of four sub-assemblies by diverting the coolant through 90° within a sub-assembly for a boiling water reactor.

FIG. 4 shows a mixing cross section in a boiling water reactor fuel assembly 1 comprising four sub-regions wherein each sub-region comprises a sub-assembly 1a. For illustrative reasons, only one of the sub-assemblies 1a is shown with a spacer 7a. Further, the fuel assembly 1 comprises a centrally arranged vertical channel 1b which extends through the whole fuel assembly and which is fixedly connected to each of the walls of the tubular container 2 by means of elongated vertical plates 9 such that the sub-regions 1a are delimited from each other. The vertical plates 9 extend along the whole fuel assembly 1 and have openings 10 which permit the passage of coolant between the sub-regions 1a. Flow arrows F show the direction of the coolant flow in the mixing cross section which is of the same type as that shown in FIG. 3.

Figure 5A:
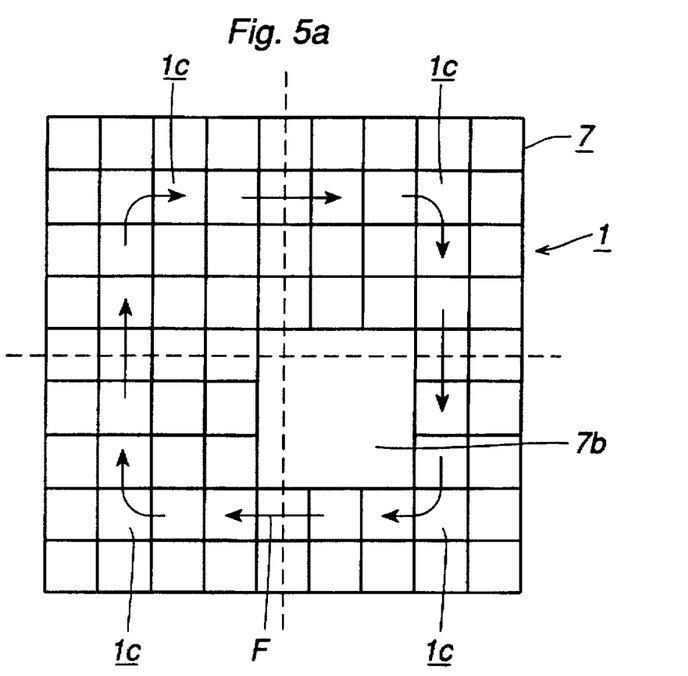
FIG. 5a schematically shows, in a boiling water reactor fuel assembly, how the mixing of the coolant flow occurs within a group of four orthogonally arranged subregions.

FIG. 5a shows a mixing cross section in a boiling water reactor fuel assembly 1. In the spacer 7 there is shown a cell 7b, the size of which corresponds to nine spacer cells. The cell 7b is intended to surround a water tube. The fuel assembly 1 is divided into four conceived, substantially equally large sub-regions 1c. The cell 7b for the water tube may be arranged at different positions depending on the type of fuel assembly 1, for example centrally in the fuel assembly 1. The cell 7b may also be designed for receiving a circular water tube. Flow arrows F in FIG. 5a show the direction of the coolant flow in the mixing cross section. Mixing in a mixing cross section comprising a fuel assembly 1 for a pressurized-water reactor is divided in a corresponding way into sub-regions 1c and has a corresponding coolant control.

Figure 5B:
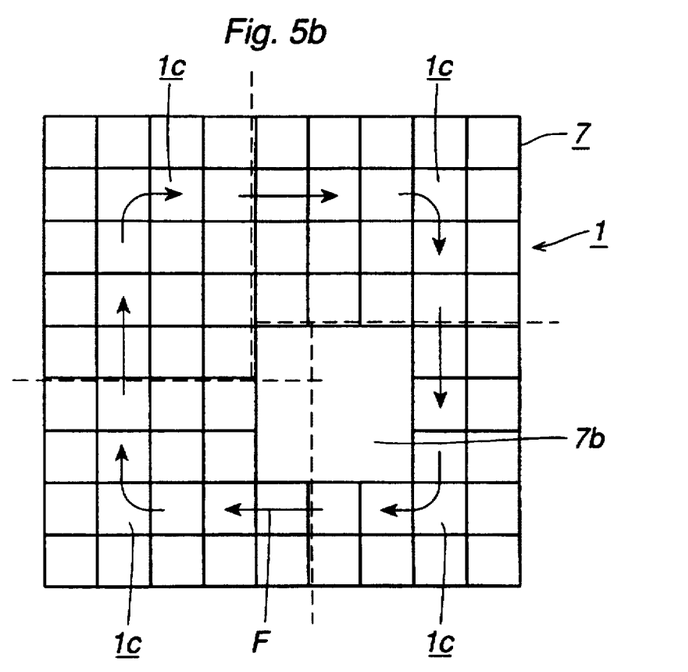
FIG. 5b shows the same as FIG. 5a but the sub-regions are defined to comprise only whole fuel rod positions.

FIG. 5b shows the same as FIG. 5a but the sub-regions 1c are defined to comprise only whole fuel rod positions.

The spacers 7, 7a according to FIGS. 4, 5a, 5b are of a so-called egg-crate structure, that is, they comprise strip elements arranged crosswise and standing on edge which form square cells through which elongated elements extend, for example control rod guide tubes 8 or fuel rods 3. The spacer cells in FIG. 4 are provided with fixed supports 7d. The fixed supports 7d are oriented such that an elongated element 3, 8, extending through the cell, is pressed against at least one of the fixed supports 7d in the cell because of the flow of the coolant.

Figure 6:
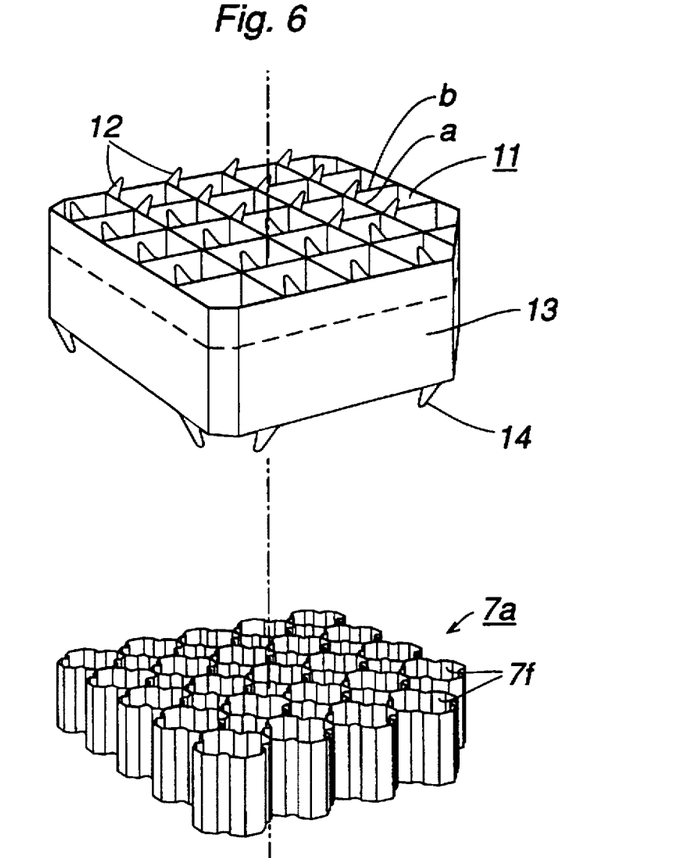
FIG. 6 shows a perspective view of an alternative embodiment of a spacer for a sub-assembly for a boiling water reactor and a flow controlling structure provided with flow control members and with a frame which, in mounted state, extends upstream so as also to surround the spacer.

FIG. 6 shows an alternative embodiment of a spacer 7a for a sub-assembly 1a, a so-called sleeve spacer comprising a plurality of sleeves 7f assembled into a grid in which each sleeve 7f surrounds an elongated element, for example a fuel rod 3. (Such a spacer is described in Swedish patent application 9303583-0). This type of sleeve spacer 7a is used in the same design also in fuel assemblies for pressurized-water reactors. Further, FIG. 6 shows a flow controlling structure 11 comprising strip elements a, b, arranged crosswise and standing on edge and forming a structure 11 corresponding to a spacer 7, 7a of so-called egg-crate structure. The flow controlling structure 11 is arranged at the downstream edge of the spacer 7a. At its downstream edge, the flow controlling structure 11 is provided with flow control members 12 for control of the flow in the way indicated in FIGS. 3 and 4, that is, a substantially 90° diversion of the flow within the sub-region 1, 1a. Further, it is clear from FIG. 6 that the flow controlling structure 11 and the spacer 7a comprise a frame 13, the upstream edge of which is provided with guiding studs 14 to facilitate insertion of sub-assemblies 1a into the fuel channel 2. In assembled state, the spacer 7a is arranged inside the frame 13 with its upper edge at the dashed line.

Figure 7:
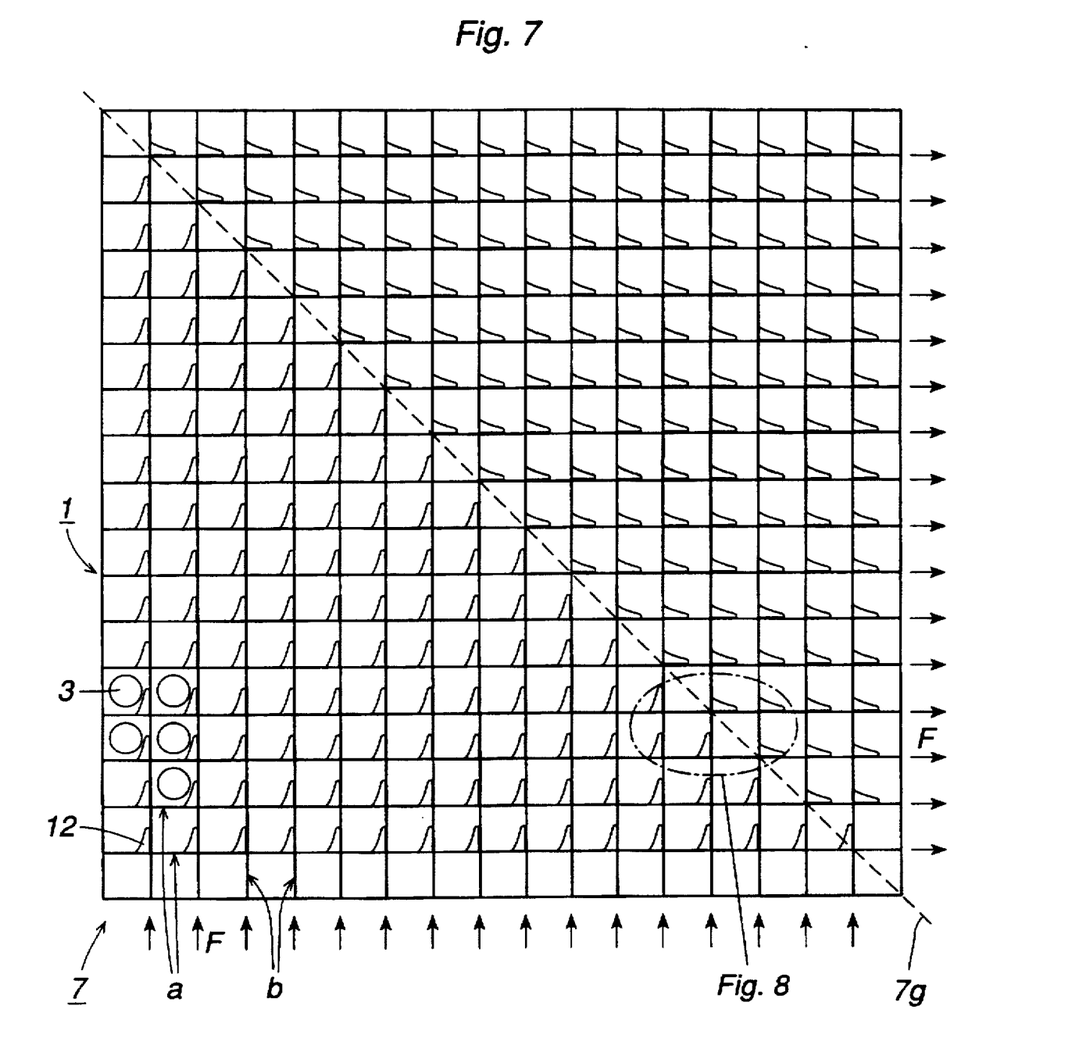
FIG. 7 shows a top view of a spacer with control members for control of the coolant flow.

FIG. 7 shows a top view of a spacer 7 with control members 12 arranged for controlling the coolant flow in the way indicated in FIG. 3, that is, a 90° diversion of the flow F within the sub-region 1. The flow-controlling members 12 may, for example, be arranged at the downstream edge of a spacer 7 of egg-crate structure. The spacer 7 is divided into two parts by a conceived diagonal 7g in the horizontal plane of the spacer 7. The control members 12 direct the coolant flow F differently on each side of the conceived diagonal 7g. At the diagonal, the main 90° diversion of the coolant flow F takes place.

In FIG. 7, the coolant flow F flows into the sub-region 1 in a direction parallel to the strip elements b. The control members 12 extend upwardly from the strip element a in the spacer cell and in a direction parallel to the strip elements b for controlling the flow flowing into the sub-region up to the conceived diagonal 7g. On the other side of the conceived diagonal 7g, the control members 12 are instead arranged so as to extend upwardly from the strip element b in the spacer cell and in a direction parallel to the strip elements a for controlling the flow out of the sub-region 1 and into an adjacent sub-region 1.

Existing flow-controlling members 12 for local mixing of the coolant flow F between fuel rods 3 may be redirected such that the local mixing in the sub-region 1 is superimposed on a global mixing between the sub-regions 1. Only a small number of fuel rods 3 are symbolically shown in FIG. 7. The control members 12 are preferably provided with a smaller angle in relation to a conceived horizontal plane the further away from the corners of the spacer 7 in the mixing center they are arranged, to reinforce the diversion.

Figure 8:
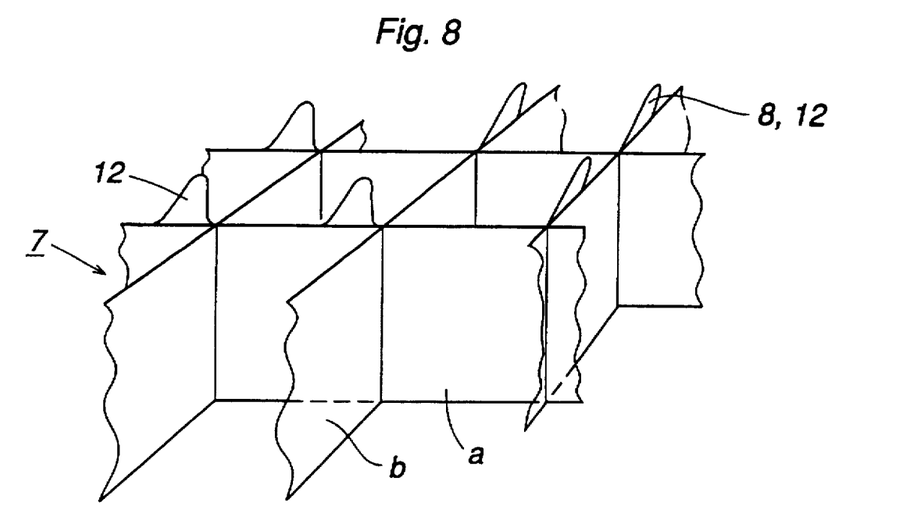
FIG. 8 shows schematically a perspective view of part of a spacer with control members according to FIG. 6.
Figure 9:
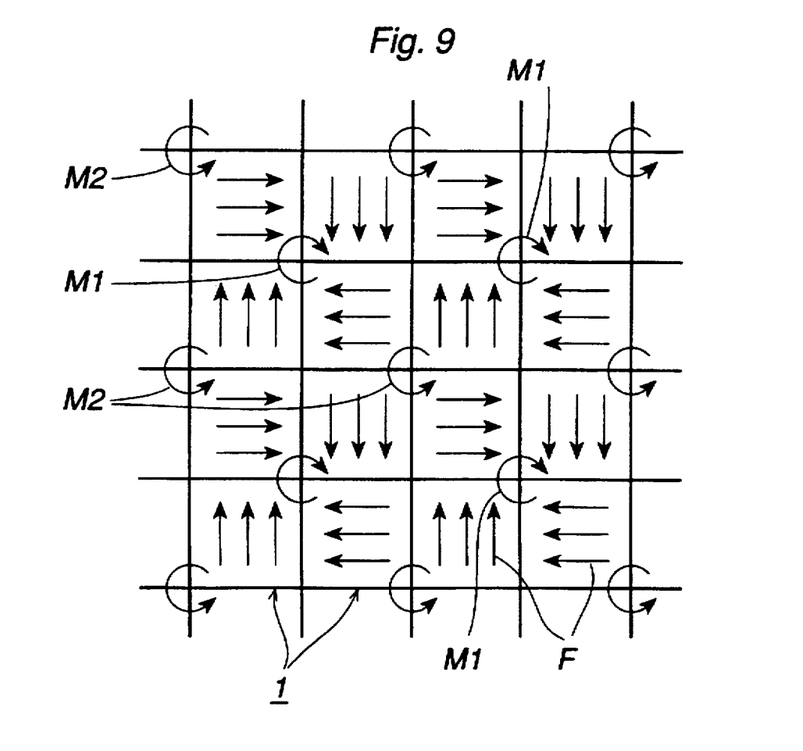
FIG. 9 schematically shows, in a section at a spacer level, mixing of coolant flow within a group of four fuel assemblies by cross-flowing.

FIG. 8 schematically shows a perspective view of part of a spacer 7 with control members 12 according to FIG. 4 or 7. FIG. 9 shows part of a core in a pressurized-water reactor with four orthogonally arranged mixing cross sections, the respective mixing centers of which are designated M1. This way of mixing coolant between sub-regions 1 is based on cross-flow therethrough. Mixing within a fuel assembly group comprising four fuel assemblies 1 is based on four substantially identical sub-regions 1 being arranged orthogonally and rotated through 90° in relation to each other in such a way that the coolant flow F is passed right across a subregion 1 and then, when being transferred to an adjacent assembly 1, makes a 90° change of direction to be passed across this assembly and so on. The individual cross-flows F result in a flow pattern in one and the same direction in the mixing cross section, indicated clockwise by M1. Where the mixing cross section comprises four orthogonally arranged fuel assemblies 1 for a pressurized-water reactor, between four orthogonally arranged mixing cross sections a flow direction opposite to the flow direction in the respective mixing cross section will arise. This is indicated by M2.

Figure 10:
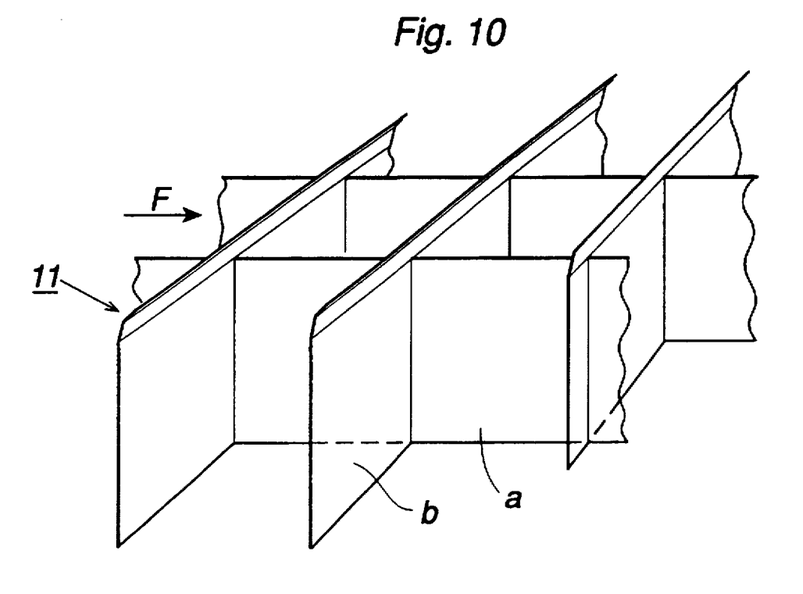
FIG. 10 shows part of a spacer with control members for cross-flow.

FIG. 10 shows part of a flow controlling structure 11 showing an alternative embodiment for achieving cross-flow. In this embodiment, the upper part of the strip elements b are bent to control the flow F across a sub-region 1, 1a, 1c.

Figure 11A:
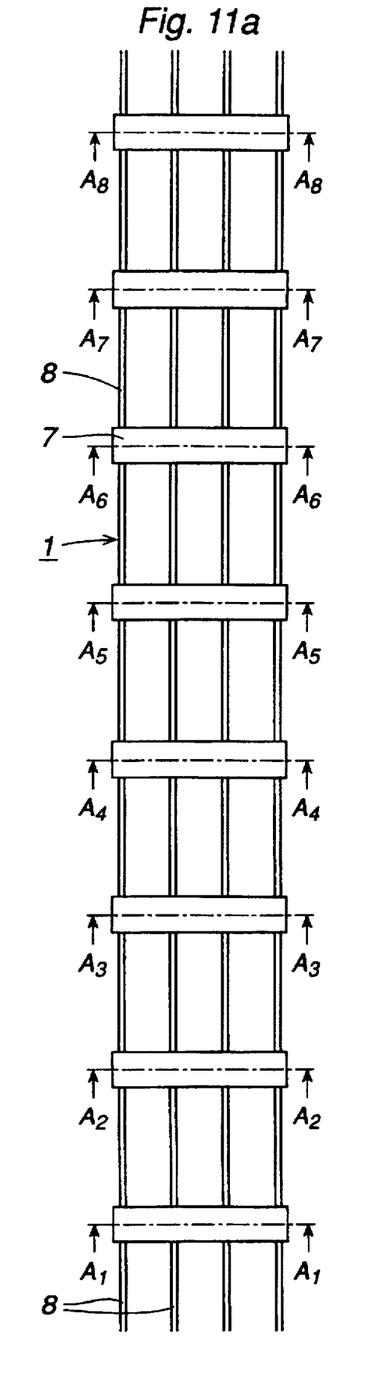
FIG. 11a schematically shows, in a side view, a fuel assembly with a plurality of spacer levels in which the main direction of the coolant flow at two adjacent spacer levels differs by an angle 90°.

FIG. 11a shows a sub-region 1 in an axial direction where the spacers 7 are arranged alternately in order to control, at one spacer level, the coolant flow F across the sub-region 1 in a first direction and, at the next spacer level, to control the coolant flow F in a second direction which is perpendicular to the first direction.

Figure 11B:
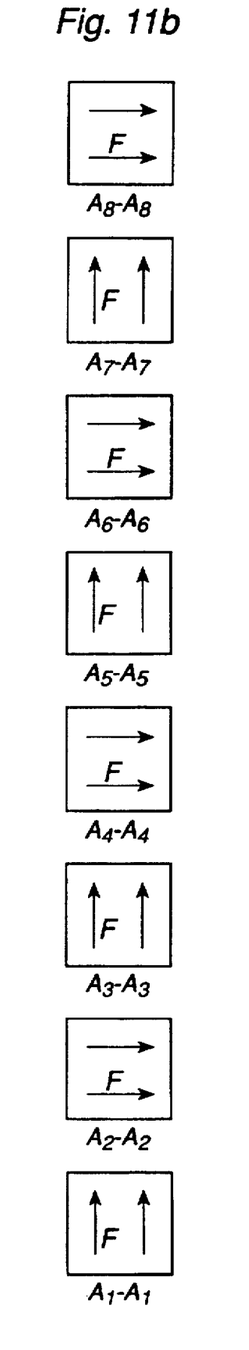
FIG. 11b shows section A—A in FIG. 11a, from which it is clear that the spacers are arranged to alternately direct the coolant flow in a first direction and alternately in a second direction perpendicular thereto.

FIG. 11b shows in a section A—A for the respective spacer level how the flow is adapted to flow at the different spacer levels. With this embodiment, on average a flow pattern corresponding to that shown in FIG. 3 is achieved.

Figure 12:
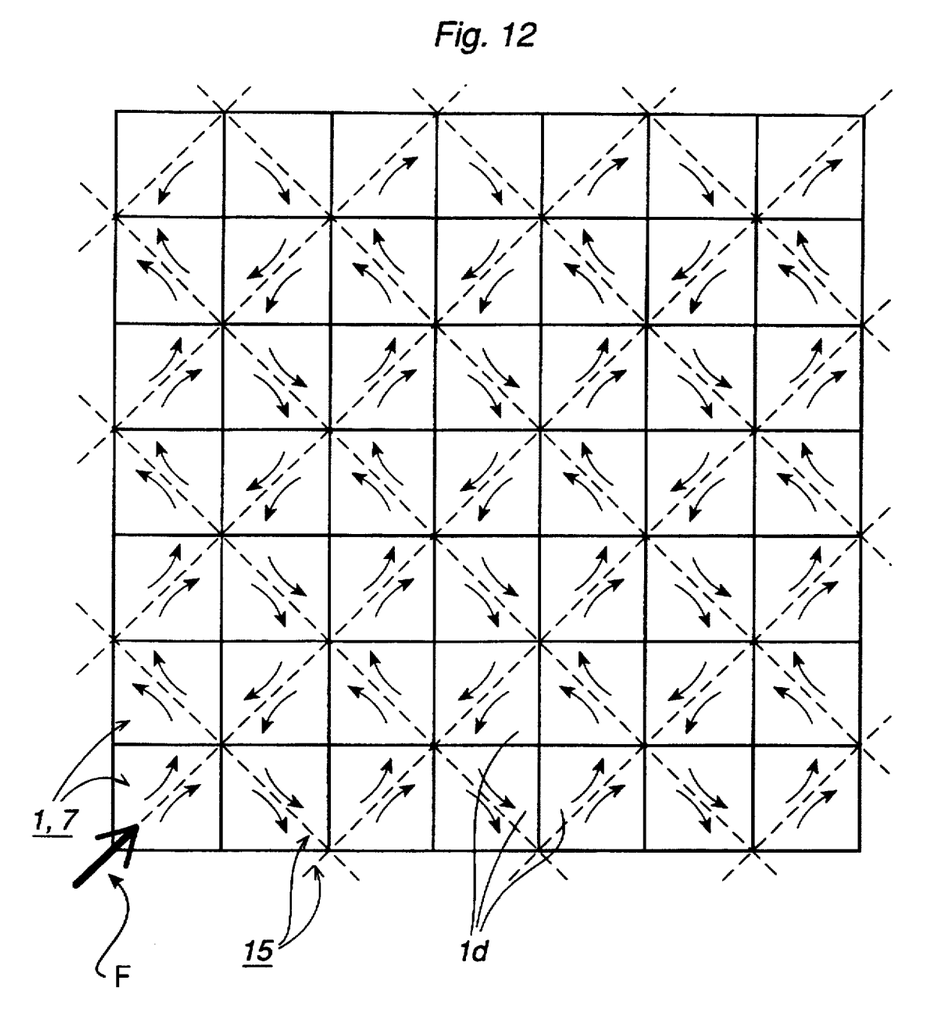
FIG. 12 schematically shows from above a section at a spacer level in a core of a plurality of fuel assemblies in which mixing of coolant flow within a group of four fuel assemblies occurs through diagonal flow.

FIG. 12 shows a section of part of a core comprising a plurality of sub-regions 1. The section comprises schematically marked spacers 7. Mixing and temperature equalization between sub-regions 1 in a group of four fuel assemblies 1 are accomplished by controlling the coolant substantially diagonally through individual fuel assemblies 1. In this case the mixing cross section comprises a cross section area 1d which in a horizontal plane through a fuel assembly 1 is arranged on one side of a conceived diagonal 15 together with three corresponding and adjacently located cross-section areas 1d. The spacers 7 direct the coolant flow F substantially diagonally through the individual sub-region 1 and a 90° diversion of the flow occurs substantially when this flow is transferred from one sub-region 1 to another. The subregions 1 are identical but inserted into the core rotated 90° in relation to each other and in such a way that the coolant flow F within the mixing cross section is one and the same. The mixing cross section according to FIGS. 3 and 9 is thus larger than the mixing cross section according to FIG. 12.

Figure 13:
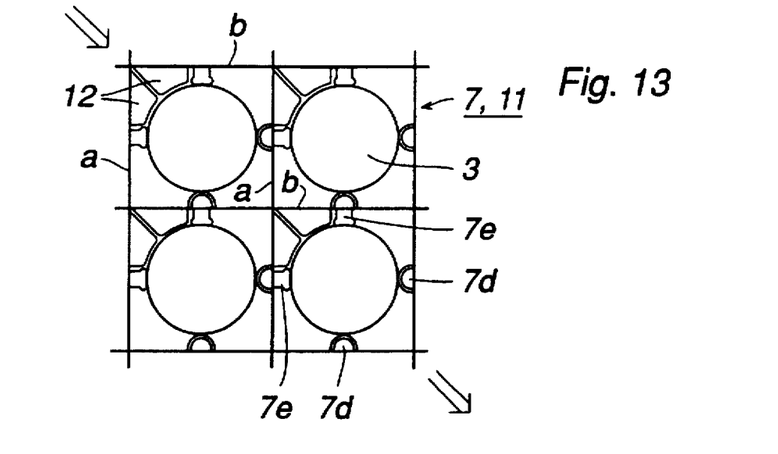
FIG. 13 shows part of a spacer or a flow controlling structure with control members in the form of vanes for controlling the coolant flow diagonally through a fuel assembly.

FIG. 13 shows a small section of a spacer 7 or a flow controlling structure 11, showing examples of control members 12 for controlling the coolant flow F diagonally through a subregion 1. The diagonal direction of flow is achieved by arranging control members in the form of two tabs 12 in one corner of a cell which surrounds an elongated element 3. One of the tabs is bent around the strip element a and directed into a centers axis conceived in the space cell, and the other tab is bent around the strip element b in the same way as the first tab. The direction of the coolant flow F causes the elongated elements 3, 8 to be pressed against the fixed supports 7d. FIG. 13 also indicates resilient supports 7e, the purpose of which is to press the fuel rod 3 against the fixed supports 7d.

Figure 14:
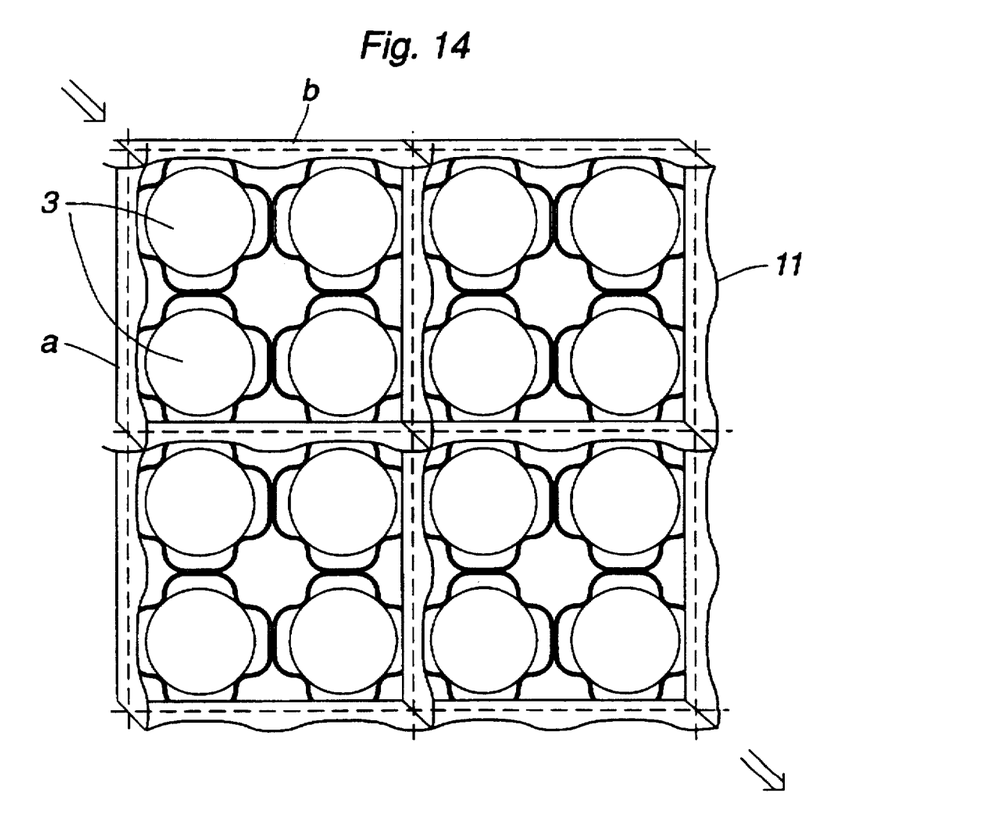
FIG. 14 shows an alternative embodiment of a spacer with control members in the form of an angled flow controlling structure for controlling coolant flow diagonally through a fuel assembly.

FIG. 14 shows a small section of a flow controlling structure 11 in which each cell surrounds four elongated elements 3. The strip elements a and b, respectively, are arranged inclined towards each other, achieving a diagonal flow. The upper edges of the strip elements a, b, are wave-formed to avoid contact with the elongated elements 3, 8.

Figure 15:
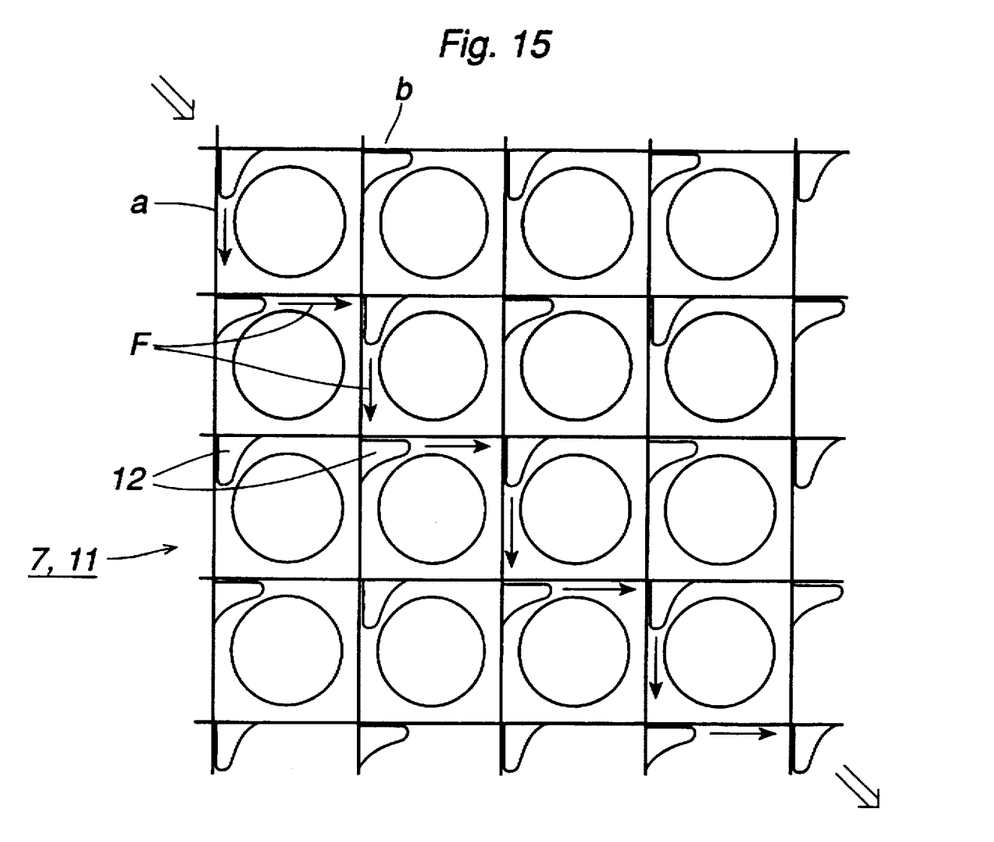
FIG. 15 shows an additional alternative embodiment of a spacer or a flow controlling structure with control members in the form of vanes for controlling coolant diagonally through a fuel assembly.

FIG. 15 shows a small part of a spacer 7 or a flow controlling structure 11, the cells of which at one corner are provided with control members 12. The control members 12 are formed as tabs folded around the strip element a, b at which they are arranged. The control members 12 are adapted to direct the flow F alternately parallel to the strip elements a, b and diagonally through the spacer 7 or the flow controlling structure 11.

It is also possible to retrim existing mixing vanes for local mixing between adjacent fuel rods 3 such that this mixing is superimposed on a global mixing between the sub-regions 1, 1a, 1c.

The principles of flow of the coolant, that is, a substantially 90° diversion within a sub-region 1, 1a, 1b, cross-flow and diagonal flow are applicable to mixing cross sections comprising all types of sub-regions 1, 1a or 1b. For illustrative reasons, however, some of the flow principles are shown only in one type of sub-regions 1, 1a or 1c.

What is claimed is:

1. A nuclear fuel core in a pressurized-water reactor including fuel assemblies, each of which comprises:

a bottom tie plate, said top tie plate and said bottom tie plate having through-openings for passing coolant flowing from beneath upwards through each of said fuel assemblies;

elongated elements, arranged between said top tie plate and said bottom tie plate;

a mixing cross section having a mixing center, said mixing cross section extending through four orthogonally arranged fuel assemblies and having a size corresponding to at least that of two fuel assemblies; and a plurality of spacers for retaining and mutually fixing said elongated elements, said plurality of spacers having flow control members for controlling coolant flow around said mixing center.

2. A nuclear fuel core in a boiling water reactor comprising having fuel assemblies, each of said fuel assemblies comprising; an elongated tubular container surrounding four orthogonally arranged sub-assemblies;

a vertical channel-forming member centrally arranged between said four sub-assemblies, said channel-forming member being secured to walls of said elongated tubular container by elongated vertical plates extending between said sub-assemblies; and openings in said vertical plates for passage of coolant between the sub-assemblies;

wherein each of said four sub-assemblies comprise elongated elements, a mixing cross section having a mixing center and having a size corresponding to the size of four subassemblies, and a plurality of spacers for retaining and mutually fixing the elongated elements said plurality of spacers having flow control members for controlling coolant flow around said mixing center.

3. A nuclear fuel core in a nuclear reactor including fuel assemblies each of which comprises:

a top tie plate;

a bottom tie plate;

elongated elements arranged between said top tie plate and said bottom tie plate;

a mixing cross section having a mixing center, said mixing cross section having a size corresponding to that of a fuel assembly; and a plurality of spacers for retaining and mutually fixing said elongated elements, said plurality of spacers having flow control members for controlling coolant flow around said mixing center and having fixed supports oriented such that said elongated elements in the respective spacer cell make contact with at least one such fixed support because of the flow of coolant in the mixing cross section.

4. A nuclear fuel core according to claim 1 wherein said flow control members divert coolant within a fuel assembly in the mixing cross section such that its main direction of flow in a horizontal section is rotated substantially 90° in relation to its direction of flow out of the fuel assembly or the sub-assembly.

5. A nuclear fuel core according to claim 1, wherein said flow control members are adapted, in a horizontal section, to control coolant to flow substantially transversely of the respective fuel assembly in the mixing cross section.

6. A nuclear fuel core according to claim 1, wherein said flow control members are adapted, in a horizontal section, to control coolant to flow substantially diagonally through the respective fuel assembly in the mixing cross section.

7. A nuclear fuel core according to claim 1, wherein each of said flow control members are formed as vanes extending from downstream edges of strip elements comprised by a spacer, and are folded around said edges.

8. A nuclear fuel core according to claim 1, wherein each of said flow control members are formed as a flow controlling structure, comprising crossed strip elements standing on edge, arranged at a downstream edge of a spacer.

9. A nuclear fuel core according to claim 8, wherein said downstream edge is inclined in relation to the elongated elements.

* * * * *

UNITED STATES PATENT AND TRADEMARK OFFICE
CERTIFICATE OF CORRECTION

PATENT NO. : 5,778,035
DATED : July 7, 1998
INVENTOR(S): NYLUND

It is certified that an error appear in the above-identified patent and that said Letters Patent is hereby corrected as shown below:

```
Column 8, after line 63, insert --a top tie plate--
and then begin a new paragraph.
```

Signed and Sealed this

Twenty-ninth Day of December, 1998

Attest:

BRUCE LEHMAN

*Attesting Officer*   *Commissioner of Patents and Trademarks*